United States Patent [19]

Welland, Jr. et al.

[11] 4,234,941
[45] Nov. 18, 1980

[54] VERBAL READ-OUT DEPTH SOUNDING SYSTEM

[75] Inventors: Frederick J. Welland, Jr., Namu; Edward C. Cairns, Richmond, both of Canada

[73] Assignee: Coast Radar and Communications Ltd., Namu, Canada

[21] Appl. No.: 945,381

[22] Filed: Sep. 25, 1978

[30] Foreign Application Priority Data

May 25, 1978 [CA] Canada .................................. 304241

[51] Int. Cl.³ ............................................. G01S 15/14
[52] U.S. Cl. ...................................... 367/116; 367/108
[58] Field of Search ............... 340/3 C, 1 C; 367/108, 367/116

[56] References Cited

U.S. PATENT DOCUMENTS

| | | | |
|---|---|---|---|
| 3,588,795 | 6/1971 | Linardos et al. | 367/108 X |
| 3,733,582 | 5/1973 | Eck et al. | 367/108 X |
| 3,942,149 | 3/1976 | Westfall, Jr. | 367/108 |
| 4,135,188 | 1/1979 | Bickley, Jr. et al. | 343/8 |

FOREIGN PATENT DOCUMENTS

515199  11/1939  United Kingdom ..................... 367/116

*Primary Examiner*—Richard A. Farley
*Attorney, Agent, or Firm*—Fulwider, Patton, Rieber, Lee & Utecht

[57] ABSTRACT

A system for measuring distance to an object. The system comprises a device for producing a high frequency sound impulse. There is a receiver for a high frequency echo sound impulse reflected from the object. A depth clock is connected to clock a counter. An initiator for the depth clock initiates the clock at a first time corresponding to the time of production of the high frequency sound impulse. The depth clock is stopped at a second time corresponding to the time of receipt of the echo sound impulse. The content of the counter is proportional to the distance to the object. A timer prevents stopping of the depth clock until a predetermined delay after the first time. A speech synthesizer produces spoken numbers corresponding to data supplied to the speech synthesizer. Data corresponding to the content of the counter are supplied to the speech synthesizer. The system is safer than prior art systems as it does not need to be observed.

8 Claims, 5 Drawing Figures

VERBAL READ-OUT DEPTH SOUNDING SYSTEM

FIELD OF THE INVENTION

This invention relates to depth sounding systems and more particularly to a system for giving a continuous readout of the measured depth.

BACKGROUND OF THE INVENTION

Depth sounders operate on the principle of transmitting a high frequency sound impulse down through the body of water the depth of which is required and receiving the echo signal bounced off the river or seabed. The time between start of the high frequency impulse and receipt of the echo is automatically measured and this is directly proportional to the water depth.

All known depth sounders incorporate a visual display of the depth and this requires that the operator shift his visual attention to the device whenever he wants to know the depth. If the vessel is in perilous water, e.g. entering an unknown harbour, particularly at night or during bad weather conditions, such distraction from the radar display or the surrounding area can prove fatal. This is particularly true in the case of night operations, with the inevitable loss of night vision caused by looking at an illuminated sounder display.

The problems are exacerbated when the depth sounder is operated by a commercial fisherman who must alternate between watching his course, working his gear, and looking at the display, so as to prevent losing his gear on a shallow bottom. However, every second he takes his eyes away from his work increases the likelihood of serious injury from hooks, nets, line winches, ect. Particularly in the case of trawlers, the fisherman is often required to tend his gear in the stern of the vessel and so it is virtually impossible for him to monitor the visual display.

Finally, conventional sounder displays are hard to see in bright sunshine, and in addition, the display must be housed within a waterproof enclosure to protect it.

SUMMARY OF THE INVENTION

It is an object of the present invention to provide a system which is capable of use as a depth sounder and which gives a verbal rather than a visual readout, thus permitting safer and more efficient handling of the vessel on which it is mounted.

According to the present invention there is provided a system for measuring distance to an object, the system comprising means for producing a high frequency sound impulse, means for receiving a high frequency echo sound impulse reflected from the object, depth clock means connected to clock a counter, means to initiate the depth clock means at a first time corresponding to the time of production of the high frequency sound impulse, means to stop the depth clock at a second time corresponding to the time of receipt of the echo sound impulse whereby the content of the counter is proportional to the distance to the object, time delay means preventing the means to stop the depth clock until a predetermined delay after the first time, speech synthesiser means for producing spoken numbers corresponding to data supplied to the speech synthesiser, and means for supplying to the speech synthesiser data corresponding to the content of the counter.

With appropriate miniaturizaton, the system could be used as a distance-measuring and obstacle location unit for the blind but it is primarily intended as a depth sounder.

The provision of a verbal readout means that a seaman operator does not have to interrupt his visual monitoring of other navigational devices or to interrupt his working of gear, in the case of a commercial fisherman, with consequent increase in safety.

Furthermore, other disadvantages of visual displays such as difficulty in reading or bright sunshine or precipitation are overcome.

The invention will now be described in greater detail with reference to the accompanying drawings:

DESCRIPTION OF THE PREFERRED EMBODIMENTS

Figure 1:
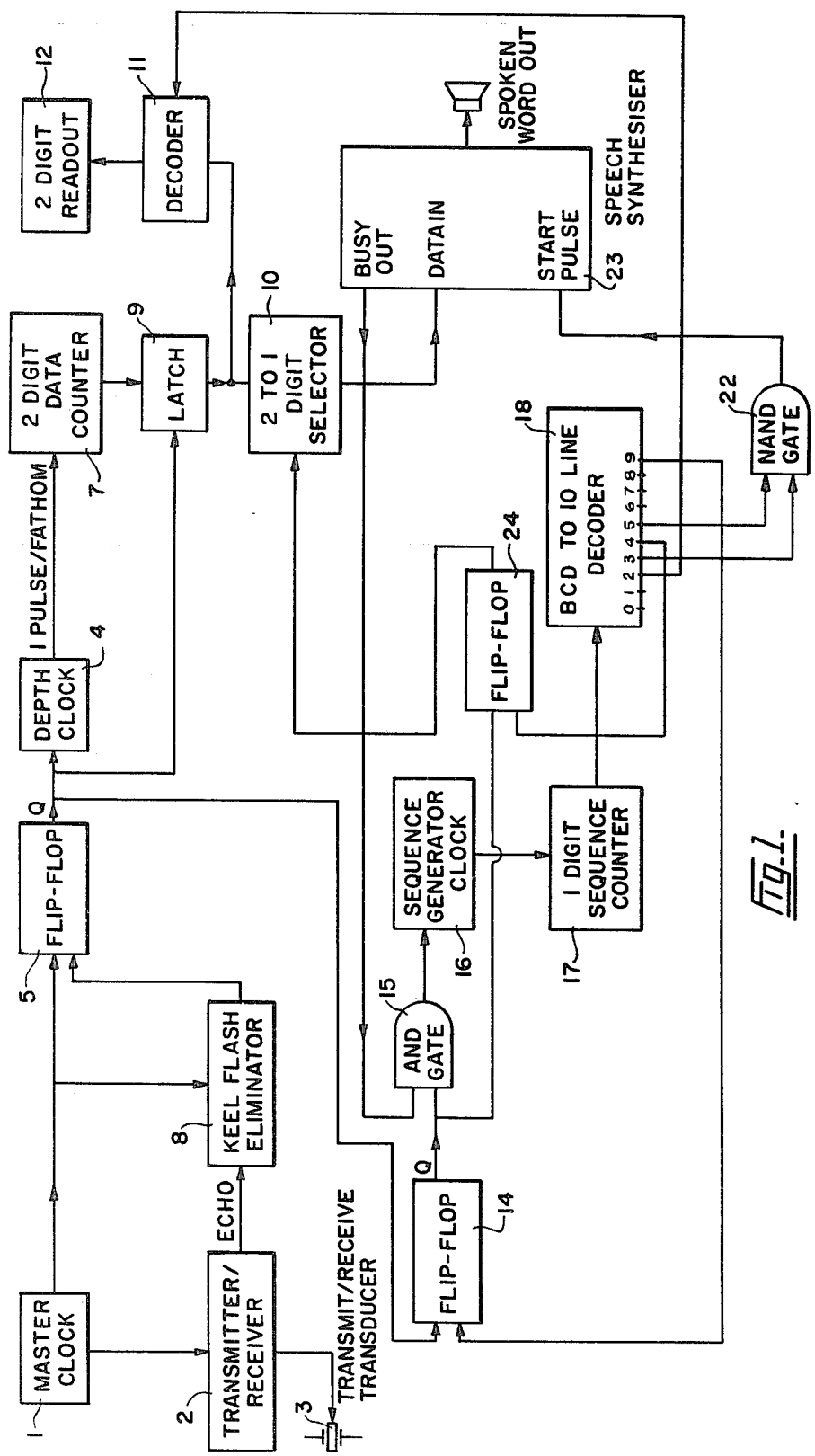
FIG. 1 is a block diagram illustrating the complete system of the invention.

With reference to FIG. 1, master clock 1 provides the basic timing pulses which are supplied to a transmitter/receiver 2 which drives a transmit/receive transducer 3 sending for every timing pulse a high frequency sound pulse burst into the body of water the depth of which has to be established. The master clock 1 also enables a depth clock 4 by means of a flip-flop 5, the depth clock providing pulses at a rate dependent on the desired read out, e.g. 412 pps for a fathoms indication of 745 pps for a metric indication. The pulses from the depth clock are fed to a two digit decade counter 7 which counts the depth pulses.

When the sonar burst strikes the bottom or large object in the water an echo is received in the transducer 3 and a resulting electrical pulse received in the transmitter/receiver 2 which derives an output pulse which is routed through a keel flash eliminator 8 to the other input of depth flip-flop 5 thus disabling the depth clock 4. The keel flash eliminator 8 acts to prevent the transmitter pulse passing through the receiver from immediately disabling the depth clock. (As this pulse occurs at time zero and hence represents zero or keel depth, it is referred to as the "keel flash"). It does this essentially by providing a small delay time after the initiation pulse from the master clock before the output pulse from the transmitter/receiver can trigger the flip-flop 5.

At the same time as the depth clock is stopped, the Q output of flip-flop 5 is also routed to the latch input 9 of the decade counter 7 thus presenting at the counter output the count existing at the time the depth clock 4 is disabled. The number of depth clock pulses generated and counted during the period of transmission and reception of the sonar pulse corresponds directly to the depth in e.g. fathoms. The latched count is presented to a digit selector 10 which is capable on instruction of choosing the count in a particular one of the two digits. The latched count is also presented to a two digit decoder 11 driving a digital readout 12.

The Q output of flip-flop 5 is also fed to an input of a flip-flop 14 which is instrumental in starting the next sequence of events. The flip-flop 14 thereby enables via an AND gate 15 a sequence generator clock 16 which applies clock pulses to a counter 17 the outputs of which are fed to a B.C.D. to 10 line decoder 18 which determines the next sequence of events.

The outputs 0–9 of decoder 18 successively switch from high to low as decoder 18 receives successive pulses from counter 17. When output 2 goes low it strobes the latch of decoder 11 to present on the digital readout the depth measured. When output 3 goes low, a NAND gate 22 to which output 3 is connected as an input goes high and causes a start pulse to be applied to the "START" input of a speech synthesiser 23. At the commencement of the speech period, the "BUSY" output of the speech synthesiser changes and is presented to a second input of the AND gate 15 to disable the sequence clock 16.

The speech synthesiser 23, on receipt of the start pulse, produces an audio output in the form of a spoken number depending on the data fed to the synthesiser from the digit selector 10. In fact, the digit selector 10 is arranged to select first the "tens" digit and so the number spoken indicates the depth in tens of fathoms. On completion of the spoken word, the "BUSY" signal changes again, causing the sequence clock 16 via NAND gate 15 to restart.

The next clock pulse from clock 16 causes output 4 of decoder 18 to go low causing a flip-flop 24 to switch over causing a high input to the digit selector 10 which then presents the data contained at the output of the units counter of the 2 digit decade counter 17 to be supplied to the speech synthesiser 23.

The next clock pulse from clock 16 causes output 5 of decoder 18 to go low once more causing the output of the NAND gate 22 to go high and again providing a start pulse to the synthesiser 23. As before the "BUSY" output of the synthesiser switches to disable the sequence clock 16 during the verbal cycle in which the synthesiser 23 produces a spoken number indicating the units portion of the depth in fathoms.

On completion of the word, the "BUSY" output of the synthesiser switches over and again the sequence clock 16 is enabled to via gate 15. When the clock input to counter 17 reaches 10, output 9 of decoder 18 goes low and as this output is connected to a second input of flip-flop 14, the flip-flop is switched over to disable the sequence clock 16 and clear counter 17, thus returning all outputs of decoder 18 to high. The output of flip-flop 14 is also routed to a second input of flip-flop 24 which is switched over to cause the digit selector 10 to select the data from the tens counter in readiness for the next cycle.

Various parts of the circuitry described above will now be described in greater detail with reference to FIGS. 2–5 each of which represents circuitry on a respective circuit board.

Figure 2:
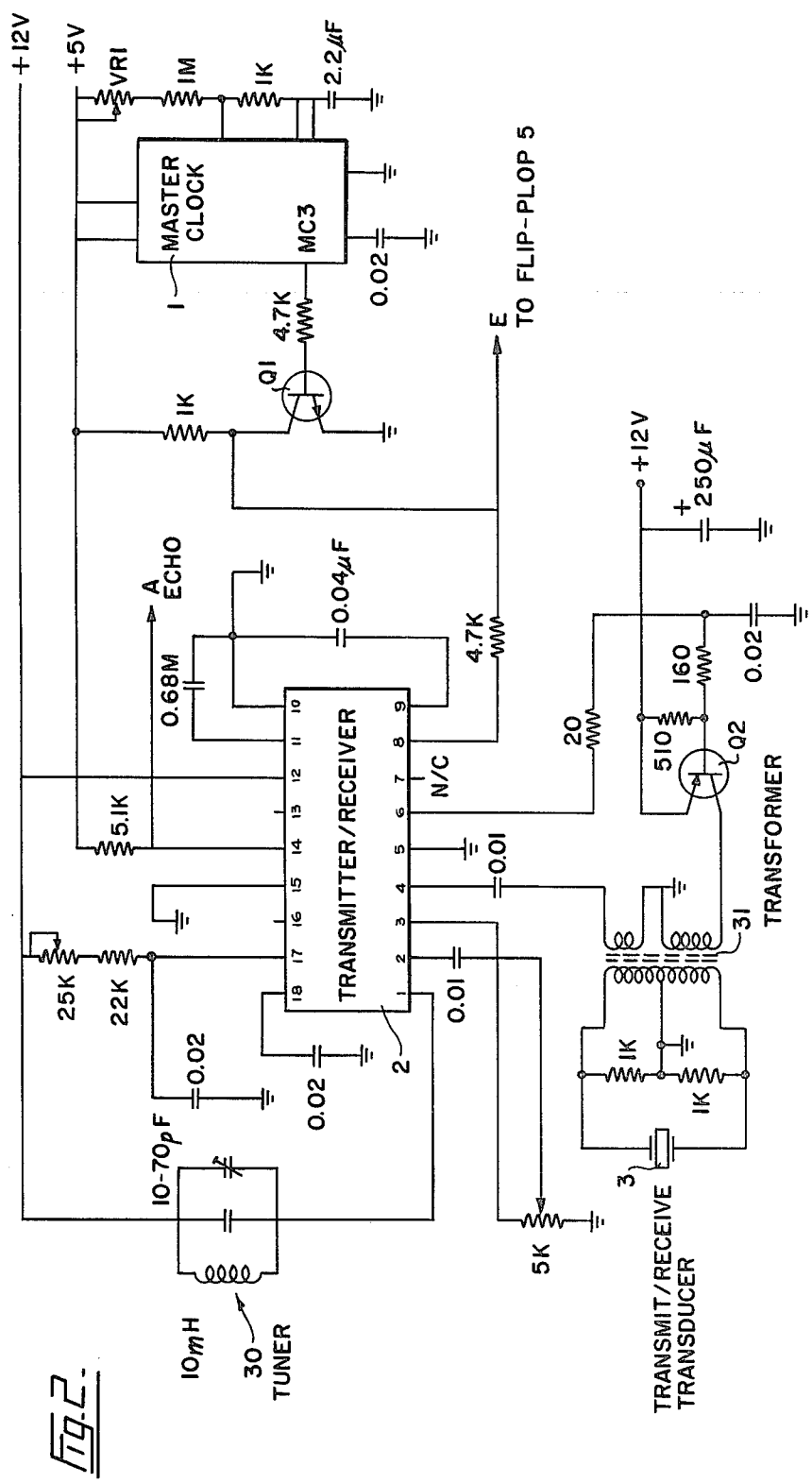
FIG. 2 is a schematic diagram of a transmitter/receiver circuit board forming part of the overall circuit of FIG. 1.

Referring firstly to FIG. 2, in addition to master clock 1 transmitter/receiver 2 and transmit/receive transducer 3, the transmitter/receiver circuit board includes transistors Q1 and Q2. Negative-going clock pulses at a rate determined by the variable resistance VR1 are derived at the output MC3 causing switching of transistor Q1 to provide inverted pulses E at the collector of transistor Q1. These are the pulses which are actually used to drive the transmitter/receiver 2 and the flip-flop 5.

On receipt of these pulses the transmitter/receiver 2 generates output pulses at output TR6 at the transmit frequency determined by the tuned circuit 30. These pulses are used to drive transistor Q2 which derives at its collector the actual transmit pulses which are coupled through a transformer 31 to the transmit/receive transmit/receive transducer 3 which derives the sonar burst. Echo sonar pulses received by transducer 3 are converted into an electrical pulse and applied to input TR3 of transmitter/receiver 2 which derives at its output TR 14 a pulse A which is routed to the depth clock and control circuitry described above.

Figure 3:
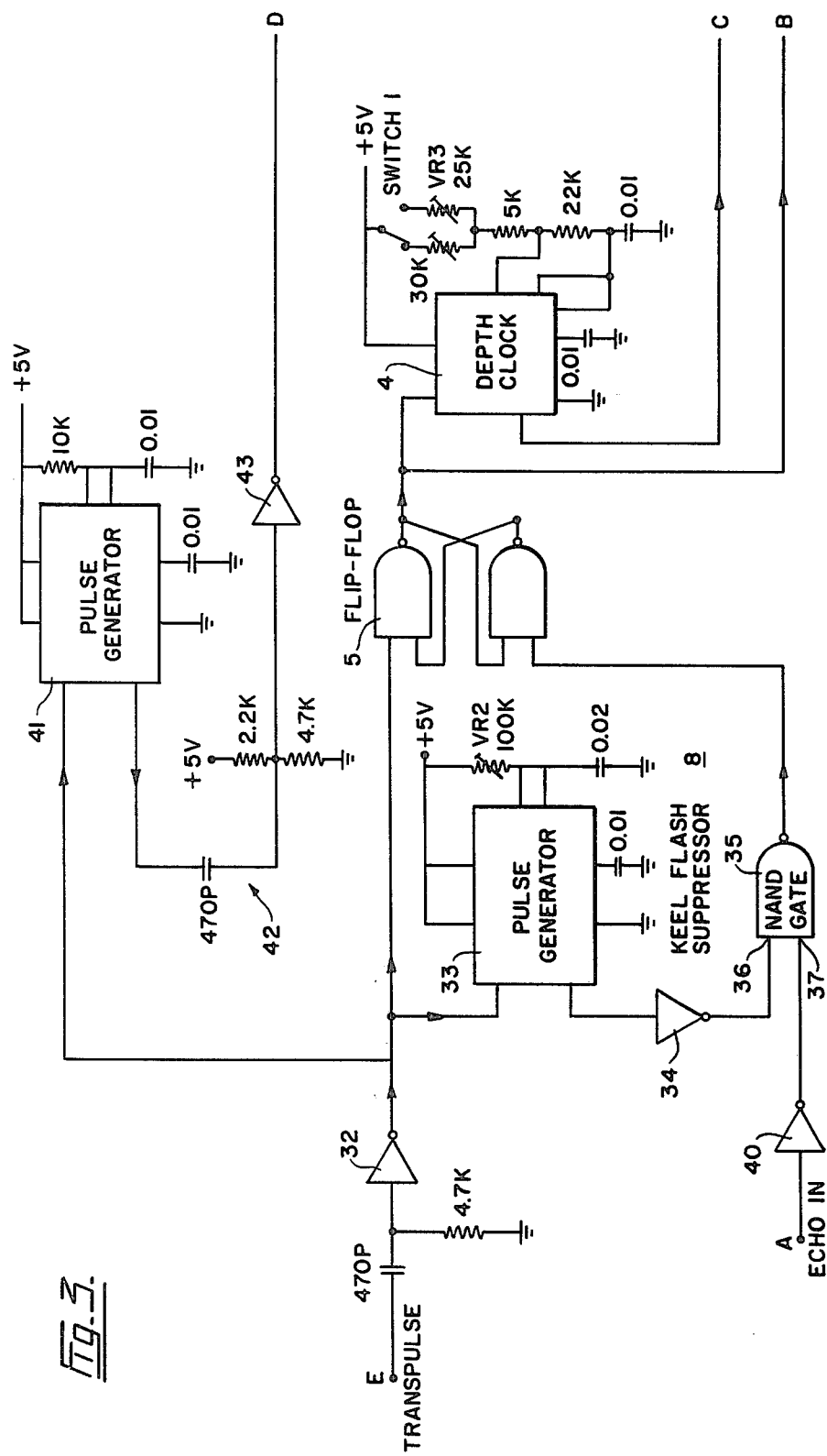
FIG. 3 is a schematic diagram of a depth clock and control circuit board forming part of the FIG. 1 circuit.

Referring now to FIG. 3 which shows the depth clock and control circuit board, the depth clock 4, flip-flop and keel flash suppressor are shown in more detail than in FIG. 1. The pulse E derived from transistor Q1 is inverted by inverter before being applied to flipflop 5. The inverted pulse is also used to trigger pulse generator 33 which together with inverter 34 and NAND gate 35 from the keel flash suppressor 8. An output pulse the width of which is adjusted by variable resistance VR2 is derived at output PG3. This positive going pulse is arranged to just exceed the width of the transmitter pulse and is inverted by inverter 34 before being passed to one input 36 of NAND gate 35. During the time that the negative-going pulse is being applied to input 36, the output of NAND gate 35 must be high regardless of the signal at the other input 37 of NAND gate 35. However, when the negative-going pulse applied to input 36 is terminated, receipt of an echo pulse A inverted by inverter 40 to a positive going pulse will cause a low pulse to be derived at the output of the NAND gate 35 to switch over flip-flop 5 and disable the depth clock 4. The frequency of the clock pulses derived at output DC3 of depth clock 4 is determined by the variable resistance circuit VR3.

Also shown in FIG. 3 is a pulse generator 41 which is triggered by the inverted transmitter pulse E to produce an output pulse which is differentiated by circuitry 42 and inverted by inverter 43 to produce a clear pulse D for clearing the counter 7 every time a transmitter pulse E is generated.

Figure 4:
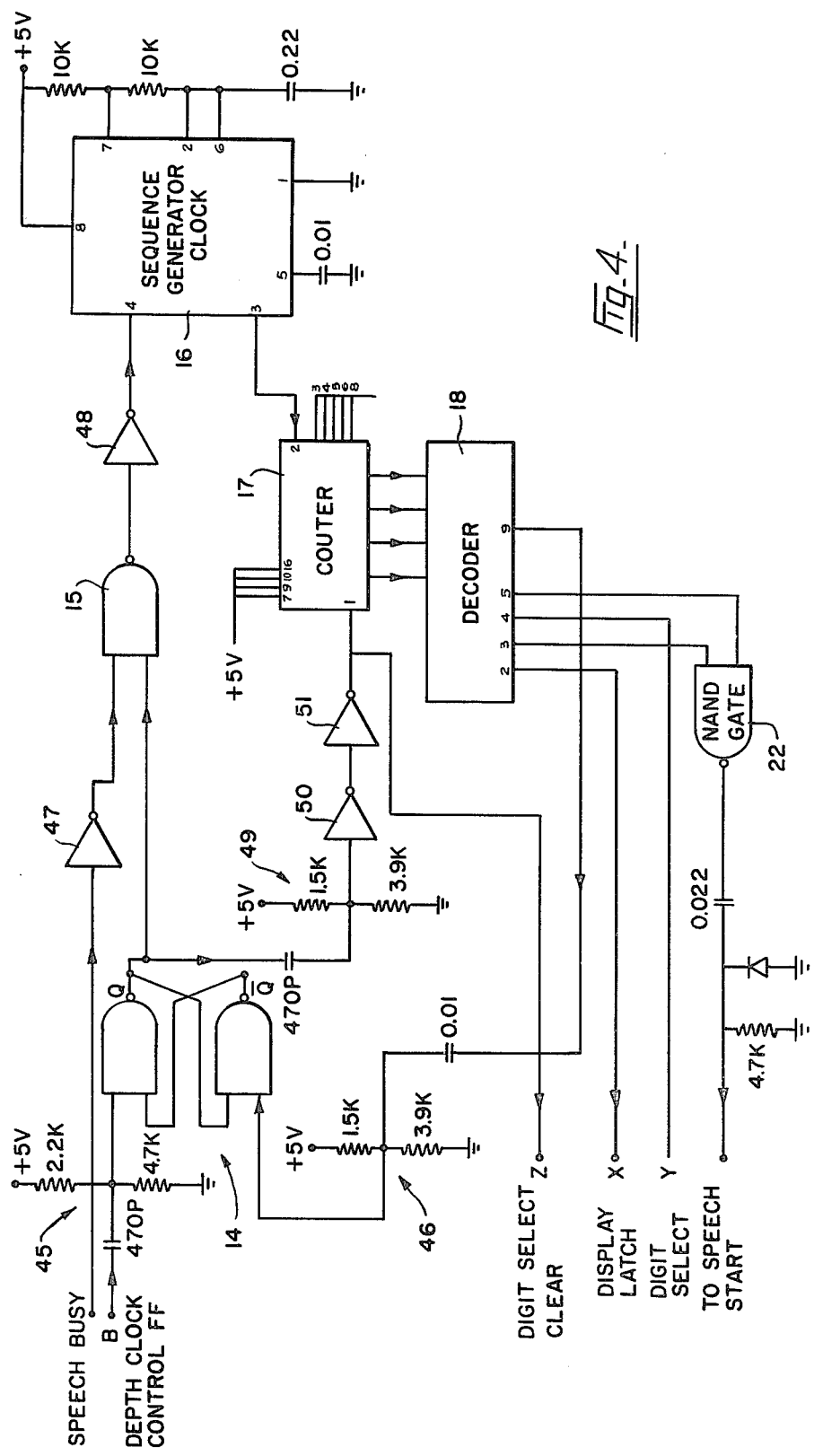
FIG. 4 is a schematic diagram of a sequency generator circuit board forming part of the FIG. 1 circuit.

Referring now to FIG. 4, this is a schematic diagram of a sequence generator circuit board including sequence generator clock 16, counter 17, decoder 18, flip-flop NAND gates 15 and 22. Also shown is a differentiated circuit 45 which interconnects the output of flip-flop 5 to an input of flip-flop 14, the differentiating circuit deriving a narrow pulse for switching flip-flop 14. The other input of flip-flop 14 is as described previously, connected to an output of decoder 18 and again a differentiating circuit 46 is used to derive a suitable switching pulse.

To obtain the correct polarity an inverter 47 is inserted in the line between the "BUSY" output of the speech synthesiser board 23 and the NAND gate 15 and an inverter 48 is included between the output of gate 15 and the input of the sequence generator clock 16.

As described in relation to FIG. 1 the Q output of flip-flop 14 is connected to an output of a flip-flop 24. Also included in this connection is a differentiator 49 and two inverters 50 and 51. The line reference Digit Select Clear Z is, in fact, connected to flip-flop 24 which will be described below with reference to FIG. 5.

Figure 5:
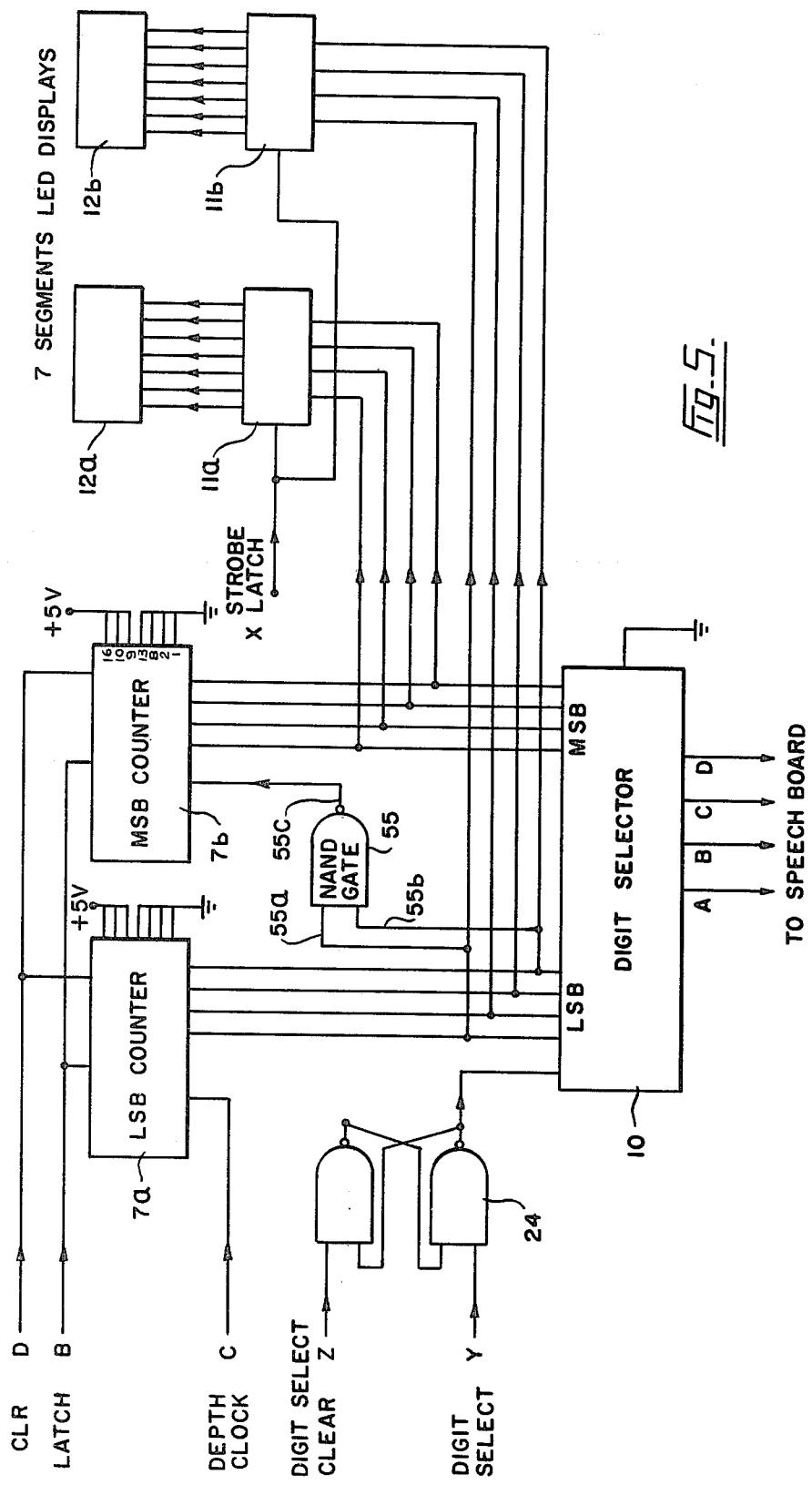
FIG. 5 is a schematic diagram of a counter/display circuit board forming part of the FIG. 1 circuit.

Referring now to FIG. 5, this shows a counter/display circuit board and includes the 2 digit counter 7 shown as two single digit counters 7a and 7b. The latch reference 9 in FIG. 1 is indicated in FIG. 5 simply as two inputs to counter 7a 7b. The digital readout 12 of FIG. 1 is shown in FIG. 5 as two 7 segment L.E.D. displays 12a and 12b driven by decoders 11a and 11b. The digit selector 10 and flip-flop 24 are also shown in FIG. 5. The NAND gate 55 is simply to step the counter 7b on every tenth pulse supplied by the depth clock 4 to counter 7a and for this reason it has two inputs 55a and 55b permanently wired to two outputs (numbered 6 and 4) of counter 7a. When these two outputs go high indicating a count of ten in counter 7a, the negative going pulse derived at the output 55c of the NAND gate is applied to the clock input of counter 7b.

The speech synthesiser 23 can be obtained from Telesensory Systems Inc. of Palo Alto, Calif. and is of a type capable of producing in a clear intelligible voice numbers corresponding to data fed in and additionally providing a "BUSY" signal indicating that the data is in the process of being verbally reproduced.

What I claim as my invention is:

1. A system for measuring distance to an object comprising means both for transmitting a high frequency sound impulse and for receiving a high frequency echo sound impulse reflected from the object, a depth clock, a multidigit counter connected to receive an output from said depth clock, means to initiate the depth clock at a first time corresponding to the time of transmission of the high frequency sound impulse, means for stopping the depth clock at a second time corresponding to the time of receipt of the echo sound impulse, whereby the content of said multidigit counter is proportional to the distance to the object, time delay means coupled to prevent said means for stopping the depth clock from actuation until expiration of a predetermined delay after said first time, speech synthesizer means having a gating input and a data input, selector means coupled to said multidigit counter and to said data input of said speech synthesizer for selectively supplying data corresponding to a single one of said digits at a time in said multidigit counter, and sequence clock means operable when the depth clock is stopped to drive a sequence generator which provides sequential pulses to different outputs, and includes a plurality of outputs coupled to said gating input of said synthesizer, and an output therebetween coupled to said selector means for sequentially stepping said selector means to couple a different digit in said multidigit counter to said data input of said synthesizer.

2. A system according to claim 1 in which the speech synthesiser is capable of producing the spoken numbers zero to nine and the counter is a two digit counter and in which the means for supplying data to the speech synthesiser is a digit select means which selects sequentially each digit in the counter and supplies to the synthesiser data corresponding to the respective digits.

3. A system according to claim 1 including a master clock for generating clock pulses, transmitting means for energizing on generation of a clock pulse a transducer to produce the high frequency sound impulse, receiving means energizing by the transducer on receipt of the high frequency echo sound impulse to produce an electrical echo pulse at an output of the receiving means, a flip-flop having a first input connected with the master clock and a second input connected with the output of the receiving means, an output of the flip-flop being connected to the depth clock whereby respective signals are derived at the output of the flip-flop depending on whether the first or the second input has been pulsed so that the depth clock is enabled on the production of a clock pulse from the master clock and disabled by the electrical echo pulse.

4. A system according to claim 3, including a first transistor connected to an output of the master clock and connected to an input of the transmitting means and to the first input of the flip-flop, and a second transistor connected between an output of the transmitting means and the transducer, the transistors being operable to derive suitable pulses for operating the flip-flop and the transducer, respectively.

5. A system according to claim 1, in which the frequency of the depth clock is adjustable to determine the units of the content of the counter.

6. A system according to claim 3 in which the time delay means comprises a pulse generator triggered by the master clock to produce a pulse of predetermined duration, and gating means to which the pulse of the predetermined duration is fed together with the electrical echo pulse from the receiving means, an output signal of a particular polarity being derived at the output of the gating means while the electrical echo pulse is present and the pulse of predetermined duration has ceased.

7. A system according to claim 1 in which the speech synthesizer includes a "busy" output connected to the sequence clock means for stopping the sequence clock means when the speech synthesizer is in operation.

8. A system according to claim 1 for measuring the depth of a body of water, in which the means for producing a high frequency sound impulse and the means for receiving a high frequency echo sound impulse are arranged to be disposed at or near the surface of the body of water.

* * * * *